US010310243B2

(12) United States Patent
Anhut et al.

(10) Patent No.: US 10,310,243 B2
(45) Date of Patent: Jun. 4, 2019

(54) DEVICE AND METHOD FOR MULTISPOT SCANNING MICROSCOPY (71) Applicant: Carl Zeiss Microscopy GmbH, Jena (DE)

(72) Inventors: Tiemo Anhut, Jena (DE); Daniel Schwedt, Weimar (DE); Tobias Kaufhold, Jena (DE); Burkhard Roscher, Jena (DE); Stefan Wilhelm, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 80 days.

(21) Appl. No.: 15/427,337

(22) Filed: Feb. 8, 2017

(65) Prior Publication Data
US 2017/0227748 A1 Aug. 10, 2017

(30) Foreign Application Priority Data
Feb. 10, 2016 (DE) .......................... 10 2016 102 286

(51) Int. Cl.
G02B 21/00 (2006.01)
G02F 1/11 (2006.01)
(52) U.S. Cl.
CPC ....... *G02B 21/0064* (2013.01); *G02B 21/008* (2013.01); *G02B 21/0032* (2013.01);
(Continued)
(58) Field of Classification Search
CPC ............ G02B 21/0032; G02B 21/0064; G02B 21/0076; G02B 21/008; G02F 1/113; G02F 1/116
See application file for complete search history.

(56) References Cited

U.S. PATENT DOCUMENTS 6,028,306 A 2/2000 Hayashi
6,462,345 B1 10/2002 Simon et al.
(Continued)

FOREIGN PATENT DOCUMENTS

AT 131942 1/1996
DE 19829981 A1 1/2000
(Continued)

OTHER PUBLICATIONS

German Application No. 10 2016 102 286.1, Search Report, dated Mar. 7, 2017, 2 pages.
(Continued)

Primary Examiner — Anner N Holder
(74) Attorney, Agent, or Firm — LaBatt, LLC (57) ABSTRACT The invention relates to a device for multispot scanning microscopy, having a multicolor light source for providing at least one illumination light beam, having a splitting device for splitting the illumination light beam into a plurality of illumination sub-beams, having first optical means for providing an illumination optical path for guiding and focusing the individual illumination sub-beams respectively into a light spot on or in a specimen to be examined, having a scan unit for guiding the light spots over the probe, having a detection unit for detecting detection light emitted by the specimen in detection sub-beams after irradiation with the individual illumination sub-beams, having second optical means for providing a detection optical path for guiding the detection sub-beams to the detector unit, having a control and evaluation unit for controlling the scan unit and for evaluating the detection light detected by the detection unit. The device is characterized in that in the illumination optical path for at least two of the illumination sub-beams a controllable beam manipulation means is present for independent setting of a spectral composition of the respective (Continued)

illumination sub-beam, and the control and evaluation unit is designed to control the beam manipulation means. The invention further relates to a method for multispot scanning microscopy.

39 Claims, 4 Drawing Sheets

(52) U.S. Cl.
CPC .......... *G02B 21/0076* (2013.01); *G02F 1/113* (2013.01); *G02F 1/116* (2013.01)

(56) References Cited

U.S. PATENT DOCUMENTS

| | | | | |
|---|---|---|---|---|
| 9,404,869 | B2* | 8/2016 | Keller | ................ G01N 21/6486 |
| 2003/0189757 | A1 | 10/2003 | Spiecker | |
| 2003/0226977 | A1* | 12/2003 | Storz | ................ G01N 21/6428 250/458.1 |
| 2006/0012872 | A1 | 1/2006 | Hayashi et al. | |
| 2011/0025837 | A1* | 2/2011 | Vossen | ................ G02B 21/002 348/79 |
| 2013/0182306 | A1 | 7/2013 | Anhut et al. | |
| 2015/0145981 | A1 | 5/2015 | Anhut et al. | |
| 2015/0185523 | A1* | 7/2015 | Matsumoto | ........... G02F 1/1313 359/238 |
| 2016/0320599 | A1 | 11/2016 | Bathe | |

FOREIGN PATENT DOCUMENTS

| | | |
|---|---|---|
| DE | 10215162 A1 | 4/2012 |
| DE | 102010047353 A1 | 4/2012 |
| DE | 102012203736 A1 | 9/2013 |
| DE | 10 2013 021182 A1 | 6/2015 |
| DE | 102013022026 A1 | 6/2015 |
| DE | 10 2014 119027 A1 | 6/2016 |
| WO | 9201966 A1 | 2/1992 |
| WO | 13131808 A1 | 9/2013 |

OTHER PUBLICATIONS

European Application No. EP 16 20 5374, European Search Report, dated Jun. 29, 2017, 2 pages.

* cited by examiner

DEVICE AND METHOD FOR MULTISPOT SCANNING MICROSCOPY

REFERENCE TO RELATED APPLICATIONS

The current application claims priority to German Application No. 10 2016 102 286.1, which was filed on 10 Feb. 2016, and which is hereby incorporated by reference.

TECHNICAL FIELD

The present invention relates in a first aspect to a device for multispot scanning microscopy according to the preamble of claim 1. In a second aspect the invention relates to a method for multispot scanning microscopy according to the preamble of claim 24.

BACKGROUND

A generic device for multispot scanning microscopy is described for example in WO-13 131 808 A1 and has the following components: a multicolour light source for providing at least one illumination light beam, a splitting device for splitting the illumination light beam into a plurality of illumination sub-beams, first optical means for providing an illumination optical path to guide and focus the individual illumination sub-beams respectively into a light spot on or in a specimen to be examined, a scan unit for guiding the light spots over the specimen, a detection unit for detecting detection light radiated by the specimen in detection sub-beams after irradiation with the individual illumination sub-beams, second optical means for providing a detection optical path to guide the detection sub-beams to the detector unit and a control and evaluation unit for controlling the scan unit and for evaluating the detection light detected by the detection unit.

A generic method for multispot scanning microscopy is also disclosed in WO 13-131 808 A1. Here, the following steps are carried out: at least one illumination light beam is provided with a multicolour light source, the illumination light beam is split into a plurality of illumination sub-beams, the individual illumination sub-beams are guided in an illumination optical path respectively into a light spot on or in a specimen to be examined and scanned over this, detection light radiated by the specimen in detection sub-beams after irradiation with the individual illumination sub-beams is guided to a detector unit and detected by this.

Laser scanning microscopy has developed into an indispensable tool in the life sciences. In particular the imaging of three-dimensional structures in a scattering background additionally makes the method suitable for a broad range of biological-medical applications. In particular the multifaceted nature of the method has led to an extensive dissemination of corresponding systems and a broad field of application.

However, the method continues to have a series of problems. These include firstly a significant tendency for bleaching of the fluorescence and generally for photo damage to the specimen, secondly a relatively slow image recording and thirdly increased noise in comparison with wide field methods.

The reasons for these issues lie in the type of image formation. This is generally carried out so that a point, more specifically the volume of the illumination point spread function (PSF), sequentially raster-scans or scans the specimen. The out-of-focus light is discriminated with respect to the focal signal light at a pinhole. This leads to an image production with the property of optical sectioning. This means that only the light from the focal plane contributes to the signal. In this way a blur-free imaging also of optically denser and slightly scattering specimens is possible. The scanning of the specimen with a laser beam leads on the one hand to high powers in a focal spot. This is the illumination spot, onto which or into which the illumination light is focused on or in a specimen. On the other hand the scanning of the specimen facilitates only a slow image formation which is limited by the speed of the scanners or by the emission rate of the dyes in the specimen. The emission rate of the dyes in the specimen is by nature low because only small volumes are respectively scanned in the specimen.

Irrespectively of its very wide dissemination in the life sciences, confocal microscopy has in particular the problem that for signal generation with an acceptable signal-to-noise ratio (SNR) a certain number of photons must be generated in a short time (e.g. 10 MHz rate signal photons for detection of 10 photons in a pixel time of 1 µs with a SNR of approximately 3; the rate in the specimen must still be significantly higher due to the losses in the system). This is associated firstly with the bleaching of the specimen and secondly with damage that makes the examination of many parameters in the field of living cell microscopy impossible or at least considerably more difficult.

Shortening the pixel time leads to a somewhat faster image formation, but on the other hand to even higher powers in the focal spot for sufficiently high signal generation. The inherent dilemma in relation to the three basic requirements: 1) image speed, 2) good signal-to-noise ratio and 3) low photo damage cannot therefore be resolved with the single spot laser scanning microscope.

A further important property of fluorescence microscopy is the spectral wideband thereof. The excitation maximums of the different dyes lie in a range extending from UV via the visible spectrum as far as the infrared spectral range. In standard commercial systems, excitation in the wavelength range of 400 nm-645 nm or higher is generally available. The scanning of the specimen with only one laser focus is also disadvantageous in relation to this point. A plurality of excitation wavelengths can be focussed in the same focal spot and therefore a plurality of fluorophores can be simultaneously excited. However, even in the case of a spectrally selective detection, so called cross-excitations always arise and detection of undesired spectral portions which can lead to a false assignment of structures or an undesired background.

Somewhat better conditions with respect to the achievable SNR are offered by a spinning disk (SD) system. Here, the light is distributed onto many (approximately 1000) focal volumes. With approximately the same SNR, the illumination time of a certain region in the specimen thus increases with simultaneously lower intensity per focal volume. This leads overall to behaviour that is greatly improved with respect to photo damage through phototoxicity. However, these systems cannot be used flexibly. In particular the spot distance cannot be varied. In addition the detection is limited to cameras, which makes a detection of more than 2 spectral channels considerably more difficult. In addition it is not possible to electronically zoom into the specimen with these non-scanner-based systems. Point measurements, such as fluorescence correlation spectroscopy, are not possible at all with these systems.

Further multipoint systems have been described in DE 102 15 162 B4, WO 13 131 808 A1, U.S. Pat. No. 6,028,306 A. A problem with these systems always arises in the provision of the scanning laser points. Arrangements for this are described for example in DE 102 15 162 B4 and DE 10 2010 047 353 A1.

A property of all these systems is additionally that they offer only a passive multibeam generation. This means that, for example, the colour splitting is generally fixed and is generally equal for all beams. In AT-131942-E, different lasers are used for different scanning points, which greatly limits the flexibility of this system. Furthermore the brightnesses of individual beams and colours cannot be individually tuned, which constitutes a problem when structures with a differing level of marking with different dyes are to be examined.

In measurements where high quality in particular is the key factor, a temporal multitrack is generally recorded. Here, the images of different fluorophores, which each require a certain wavelength for excitation and a certain spectral configuration for detection, are recorded one after the other in time, although the conventional systems in principle make simultaneous recording possible. Even if the user has a time disadvantage here, the benefit with respect to the quality achieved outweighs this.

AT-131942-E indicates a system which avoids the effect of spectral crosstalk by the spectral excitation taking place at respectively different locations in the specimen. Reference is made here to a spatial spectral multitracking. However, the colour channels are thereby fixedly predefined and not configurable. This system cannot therefore be optimised, in the case of specimens that contain fewer than the number of dyes that can be detected in principle, with respect to other parameters such as for example specimen preservation or speed, as the wavelength distribution is fixedly predefined.

SUMMARY OF THE INVENTION

It can be regarded as an object of the present invention to indicate a device and a method, wherein the abovementioned problems are extensively avoided.

This object is achieved by means of the device having the features of claim 1 and by means of the method having the features of claim 24.

Advantageous embodiments of the device according to the invention and preferred variants of the method according to the invention will be described below, in particular in association with the dependent claims and the figures.

The generic device indicated above has been further developed according to the invention in that a controllable beam manipulation means is present in the illumination optical path for at least two of the illumination sub-beams for the independent setting of a spectral composition of the respective illumination sub-beam and also in that the control and evaluation unit is designed to control the beam manipulation means.

The generic method indicated above was further developed according to the invention in that a spectral composition of the illumination light is independently set for at least two of the illumination sub-beams.

An essential advantage of the present invention can be seen in that the device according to the invention can be optimised in dependence upon the specimen or can even optimise itself such that a significant increase in the scanning speed, a reduction in the photo damage, avoidance of spectral cross-excitations or an increase in the signal-to-noise ratio can be achieved. Furthermore in different excitation/detection paths thus formed, different types of sensors can be combined (for example the combination of a spatially resolving, for example pixelated, detector, with which the point spread function (PSF) can be spatially measured, with an integrating detector). A flexible optical arrangement for different measurement tasks in biomedical imaging is thus provided. At the same time a new spectrally selective microscopy method is provided.

The first optical means and the second optical means preferably have as common components at least one microscope objective, an x-y scanner unit and/or at least one main colour splitter.

The essential advantages of the invention are already realised by the spectrum of the illumination light being set separately and independently in a plurality of illumination sub-beams. It is particularly preferred, however, for a controllable spectral selection means to be present additionally in the device according to the invention in the detection optical path for at least two of the detection sub-beams to independently influence a spectral composition of detection light passing via the respective detection sub-beam to the detection unit, and the control and evaluation unit is also designed to control the spectral selection means. A variant of the method according to the invention corresponds thereto, wherein in the case of at least two detection sub-beams a spectral composition of detection light passing via the respective detection sub-beam onto the detection unit is independently influenced. In these variants the particular advantage is achieved that both on the illumination side and also on the detection side there is a spectral selection. The measurement can therefore be tailored highly specifically to the respective specimen and in particular to the fluorescence dyes respectively used.

In principle the essential idea of the invention is already realised if the spectral composition can be independently set in at least two illumination sub-beams. However, variants of the device according to the invention are particularly preferred, wherein a beam manipulation means is present in the illumination optical path for each illumination sub-beam for independent setting or adjustment of a spectral composition of the respective illumination sub-beam. A variant of the method according to the invention, wherein the spectral composition of the illumination light is set independently for each illumination sub-beam, corresponds to these exemplary embodiments. The above-described advantages according to the invention that the illumination and detection can be particularly well adapted to specimens in principle of any kind and in principle any desired fluorescence dyes are thereby achieved in a particular way. In particular it is possible to also measure spectrally overlapping bands with the device according to the invention.

For the same reason, exemplary embodiments of the device according to the invention are preferred, wherein a controllable spectral selection means is present in the detection optical path for each detection sub-beam for independent influencing of a spectral composition of detection light passing via the respective detection sub-beam to the detection unit. In a variant of the method according to the invention, in each detection sub-beam the spectral composition of detection light passing via the respective detection sub-beam to the detection unit is independently influenced accordingly. A highly functional device as well as a method that can be comprehensively configured with respect to the most varied measurement situations are provided with these exemplary embodiments.

In principle, for example if multiplexing technologies are used, a single detector can be sufficient to detect the detection light. However, the detection unit preferably has a plurality of individual detectors for measuring the detection light emitted respectively by a certain light spot on the specimen. The measurement data can then be particularly effectively recorded.

A further preferred exemplary embodiment of the device according to the invention is characterised in that the optical components in the detection optical path, in particular the controllable spectral selection means, are components conserving the point spread function. Further useful information on the specimens to be examined can be obtained from the point spread function.

In principle the individual detectors can be, for example, photomultipliers or individual photodiodes. If, however, for example a point spread function is to be measured, it is useful if the individual detectors are respectively spatially resolving detectors and in particular respectively two-dimensional photodiode arrays. There, single photon avalanche diode arrays (SPAD arrays) are particularly advantageous. These have a very good sensitivity, with which individual photons can also be counted. In addition, pixelated structures of these avalanche photodiodes can be produced. Besides these sensors, however, conventional photomultipliers can also be used if they are provided with light spreading means (Airyscan Module by Zeiss). Finally, microchannel plates and/or fibre-coupled photomultipliers can also be used. It is particularly advantageous if different sensor types are used, for example a spatial measurement of the point spread function with a spatially resolving detector combined with an integrating detector. In principle all components that have the desired function of a spectral selectivity can be used as beam manipulation means. This function can be based in principle upon refraction, diffraction, selective reflection and/or absorption.

In order to be able to rapidly vary or modulate the intensity of laser light, acousto-optic elements are preferably used in laser scanning microscopy as beam manipulation means. If merely one laser line is to be influenced in its intensity, an acousto-optic modulator (AOM) can be used. If on the other hand there is a multiplex of a plurality of laser lines of differing wavelengths, which are each to be varied in their intensity, an acousto-optic (AOF) filter must be used. In general, acousto-optic modulators (AOM) allow higher modulation frequencies than AOTFs. Such acousto-optic elements are specially cut and ground crystals (for example of $TeO_2$), in which a diffraction grating is produced using high frequency signals that excite a transducer for vibration.

Both the spectral and also the optical properties of the acousto-optic element are determined substantially by the form and size of this transducer. A part of the laser light coupled into the acousto-optic element is diffracted at the grating excited in the crystal. This portion of the laser light deflected by diffraction can be adjusted in its intensity by the power of the high frequency signal supplied being varied.

While, in the case of an AOM, only a high frequency carrier with the characteristic frequency $f_\lambda$, needs to be supplied in order to influence one laser line of the wavelength $\lambda$, in the AOTF a multiplex of a plurality of high frequency carriers is required in order to vary a plurality of laser lines in their intensity.

Such acousto-optic elements are offered both as spatially single channel and also multichannel. In a single channel AOM/AOTF merely one transducer is arranged on the crystal. Consequently only one laser beam or one bundle of a plurality of laser lines can be influenced. In a spatially multichannel AOM/AOTF, a plurality of transducers are arranged one beside the other on one and the same crystal. It is thereby possible to influence a plurality of parallel laser beams of the same wavelength (AOM) or a plurality of parallel laser line bundles (AOTF) that are collinear in themselves (AOTF) simultaneously but independently of each other in their intensity.

The beam manipulation means preferably has a plurality of acousto-optic elements, in particular AOM, AOD and/or AOTF. Acousto-optic components are commercially available, in particular also in very small structural sizes, which are advantageous for microscopy. Furthermore, however, alternative segmented beam manipulation means such as for example multichannel electro-optic modulators (EOM) or spatial light modulators (SLM, DMD, MEMS, etc.) can also be advantageously used.

In a particularly preferred exemplary embodiment of the device according to the invention the beam manipulation means has at least one spatially multichannel AOTF. Correspondingly, in a particularly preferred variant of the method according to the invention for independent setting or adjustment of the spectral composition of the illumination light in the illumination sub-beams, at least one spatially multichannel AOTF/AOM is used as beam manipulation means. Such spatially multichannel AOTF/AOMs are particularly suited for multispot scanning microscopy because the illumination beams can be guided comparatively densely beside each other with these components. The lenses used can therefore also be comparatively small.

The invention also relates to the advantageous control or driving of an acousto-optic element, for example an AOTF/AOM, with a plurality of channels.

For the control of AOM/AOTFs, special HF synthesiser assemblies are used which provide, depending upon the application, individual sinusoidal high frequency signals (AOM) or a multiplex of a plurality of high frequency signals of differing frequencies (AOTF). The power of the high frequency signals can, depending upon the design of the synthesiser assembly, be influenced with analogue control signals or be digitally modulated. In the case of control of spatially multichannel AOM/AOTFs it is possible in principle to split or divide the control signals provided by the synthesiser assemblies with the aid of power splitters between the transducers. By proceeding in this way, however, the flexibility is considerably limited because the modulation then takes place synchronously for all transducers of the spatially multichannel AOM/AOTF.

A substantially more flexible control is possible if each transducer of a spatially multichannel acousto-optic element is controlled by a separate synthesiser assembly. Due to interactions between the transducers of a spatially multichannel acousto-optic element a series of conditions are to be met in the design of the synthesiser assemblies in order to avoid undesirable secondary effects.

A sub-task of the invention is therefore to provide an arrangement and an operating mode of the synthesiser assemblies which leads to influencing (cross-coupling) of the transducers of a spatially multichannel AOTF/AOM between themselves that is as low as possible.

This sub-task is achieved by a variant, wherein the control signals for the different channels of the spatially multichannel AOTF/AOM have a constant phase position relative to each other, in particular after a switch-on process. The main advantage of using multichannel AOTFs is the comparatively low construction size thereof such that the illumination beams can be guided closely to each other. This facilitates the use of comparatively small components, in particular comparatively small lenses. The lateral distance of the light beams is preferably between 5 and 50 times and particularly preferably between 8 and 15 times the diameter of the light beams.

It was recognised according to the invention that by adjusting a differential phase $\theta_n$ of the signal generators it is possible to improve the insulation between the channels of a spatially multichannel AOTF/AOM significantly.

In addition the invention recognised that it is advantageous if in the case of each new start of the synthesiser assembly, i.e. the assembly that provides the control signals for the transducers of the spatially multichannel AOTF/AOM, a defined relative initial phase position is set between the spatial channels. This is particularly significant when using a spatially multichannel acousto-optic element as an equaliser for multispot applications in parallelised image recording of the type described in this application. In this mode, each sub-beam goes over a certain part of the specimen and generates a sub-image. The final image is put together finally by bringing together the sub-images in the control and evaluation unit. It is necessary for all sub-images to have the same brightness at the connection points, as otherwise interfering structures arise in the final image of the specimen. If a defined relative initial phase position of the control signals cannot be ensured, on account of the interactions between the transducers of the spatially multichannel acousto-optic element, intensity differences can arise in the channels depending upon the phase position. If the acousto-optic element transmits a multiplex of a plurality of laser lines with the wavelengths $\lambda$, the defined differential phase $\Delta_\theta$ has to be separately set for each excitation frequency $f_\lambda$.

Through an appropriate selection of the differential phase $\Delta_\theta$ of directly adjacent transducers, the interactions between the diffraction gratings excited by them can be reduced and an optimisation of the insulation thus achieved. Measurements to date have shown that the smallest interactions arise if the following applies for the differential phase $\Delta_\theta$:

$$\Delta_\theta = 90° + k \times 180° \text{ (}k\text{ is an integer).}$$

Deviations from this value are possible and can be caused for example by running time differences in the assemblies for signal synthesis and in the system wiring.

Further improvements are thus possible in an embodiment of the device according to the invention and a variant of the method according to the invention wherein the excitation signals of the multichannel AOTF for spatially adjacent channels have a relative phase distance of 90°+n×180°. n is thereby a whole number. It was surprisingly recognised within the scope of the invention that the crosstalk of the signals of adjacent channels of the multichannel AOTF is particularly low if such a phase distance is selected. For the illumination of the spatially multichannel AOTF/AOM the illumination light beam is split by means of an optical splitting device into a plurality of illumination sub-beams.

In principle any component, with which the desired splitting of the illumination beam can be achieved, can be used for the splitting device. These components can be in particular refracting or diffracting components. Variants wherein the splitting device has at least one waveguide chip are particularly preferable. Waveguide chips are commercially available components.

A particularly preferred exemplary embodiment of the device according to the invention is characterised in that the control and evaluation unit is designed to tune to each other the beam manipulation means in a certain illumination sub-beam on the one hand and the spectral selection means in that detection sub-beam that comes from the light spot generated by the certain illumination sub-beam on the specimen on the other hand. With regard to the method, the beam manipulation means in a certain illumination sub-beam on the one hand and the spectral selection means in that detection sub-beam that comes from the light spot produced by the certain illumination sub-beam on the specimen on the other hand are preferably tuned to each other. In this embodiment the advantages according to the invention are particularly effective. A spectral selection is carried out both on the illumination side and, tuned thereto, on the detection side. The complexity of the detection-side filter systems can thus be significantly reduced. In association therewith a high optical transmission of the filter arrangement can be guaranteed.

This variant can be developed particularly usefully and advantageously by the control and evaluation unit being designed to control the beam manipulation means and the spectral selection means to detect at least one, in particular precisely one, determined fluorescence dye on or in the specimen. In terms of the method the spectral composition of the illumination light can preferably be set in the illumination sub-beam and the spectral selection means can be controlled in the detection sub-beam to detect at least one certain, in particular precisely one, fluorescence dye. The individual fluorescence dyes can therefore be separated particularly well with the device according to the invention and the method according to the invention. In addition the device can be purposefully set to detect certain fluorescence dyes. In particular spectrally overlapping bands can also be detected.

In principle all components with which the selection of the spectral portions of the detection light desired for the detection can be achieved can be used as controllable spectral selection means. For example the selection means can have at least one colour filter and/or at least one dispersive means, in particular a refracting means, for example a prism, and/or a diffracting means, for example a diffraction grating in combination with mirroring elements. Essentially in fluorescence microscopy, for which the invention can be advantageously used, emission light of the dyes used is to be detected.

In one preferred variant the selection means have a plurality of colour filters. These can be for example graduated colour filters. The controllable selection means can for example be the same for all detection sub-beams. Graduated colour filters are components wherein incoming light is reflected if the wavelength of this light is less than a threshold wavelength and is transmitted if the wavelength of the incoming light is greater than the threshold wavelength, or vice versa. These components are thus described as graduated colour filters, because the threshold wavelength is different depending upon the contact point of the incident light on these components, and in particular continuously changes with the contact position of the light. By displacing these graduated colour filters the threshold wavelength can thus be advantageously continuously adjusted. In addition, discrete colour splitters or adjustable (tunable) colour splitters can be used, of which the wavelength-selective behaviour depends upon their angular orientation relative to the optical axis (by way of example we can mention here the commercially available VersaChrome filter by Semrock). However, rotary filters can also be used at this point that have different spectral properties in different rotation positions.

If only one single dye is scanned in a specimen region, it can be preferred if the beam manipulation means are controlled so that the spectral composition is the same for all illumination sub-beams. Therefore, either a more rapid recording of a specimen region or a recording with a better signal-to-noise ratio can be achieved.

Alternatively or additionally, the controllable selection means can be the same and/or set the same in all detection sub-beams.

The device according to the invention can thus be configured so that multispot scanning microscopy can be carried out with a plurality of illumination sub-beams and detection sub-beams that are identical in principle.

In a further preferred variant of the method according to the invention the beam manipulation means are controlled so that each illumination sub-beam has a different spectral composition. This variant can be used if a plurality of dyes are to be simultaneously detected in a specimen region.

Mixed forms of the variants described are also possible and can be advantageous. This means: for example in the case of a total of four illumination sub-beams, each two of these sub-beams can have the same illumination spectrum. Accordingly, the detection sub-beams associated with the illumination sub-beams and the beam manipulation means located there can each be set the same. In principle, with such an arrangement, two identical illumination sub-beams and subsequent detection sub-beams would be present in each case.

This arrangement can be optimised dependent upon the specimen or can optimise itself in that a clear increase in the scanning speed and/or a reduction in the photo damage and/or avoidance of spectral cross-excitations and/or an increase in the signal-to-noise ratio is/are achieved.

A preferred embodiment of the method according to the invention is characterised, finally, by an image resulting from the respectively detected detection sub-beams being calculated, generated and/or shown to solve a measurement task.

A flexible optical arrangement is thus made available for different measurement tasks in biomedical imaging. At the same time a new spectrally selective microscopy method is described.

BRIEF DESCRIPTION OF THE DRAWINGS

Further advantages, features and properties of the invention will be described below by reference to the attached drawings, in which.

DETAILED DESCRIPTION OF THE INVENTION

The basic principle for the measurement with the device according to the invention is based on a laser scanning microscope. The optical arrangement of the microscope is designed so that operation in a parallel mode is optically produced. It is crucial that a plurality of illumination light beams can be coupled into the microscope.

A certain number of laser lines can be offered to this microscope for spectral illumination. Firstly it is irrelevant whether they are discrete laser lines, a tunable laser or a white light laser. In addition it is insignificant whether the lasers are continuous or pulsed. Finally the usability of the invention is not limited to certain excitation mechanisms such as for example the usual fluorescence excitation. Non-linear processes, in particular two-photon processes, such as in two-photon fluorescence or CARS microscopy, can be used. These spectral components can be mirrored, in particular using a main colour splitter, into the optical path of the microscope. For this the main colour splitter must support all wavelengths to be coupled into the microscope. This means that the main colour splitter must act as a mirror for all wavelengths to be coupled in. This is possible for example with dichroic elements. However, it is also possible here to combine a plurality of main colour splitters in their effect and to manipulate one or both beams in the spectrally split space. Furthermore the detection light can be split at the main colour splitter. Besides the conventional dichroitic beam splitters, however, further methods of wavelength separation between excitation and detection are also possible. An acousto-optic beam splitter (AOBS) can thus also be used.

Conventionally in laser scanning microscopy the object is scanned with only one laser point. However, other arrangements are also known, for example line-scanning systems. In the present invention the excitation light is to be introduced into the specimen such that a plurality of illumination spots raster-scan the object. For this, the light coming from the laser source must be spatially split. An optical arrangement will be described below that provides a plurality of illumination spots for scanning the specimen. These illumination spots can be set according to the invention individually both in their intensity and also in their colour.

Furthermore the individual beams can also be individually modulated. It is particularly preferred for the beam quality of the individual illumination sub-beams to be very high, whereby this constitutes a basic prerequisite for a laser scanning microscope if a high image quality is to be achieved.

The same and similar components are generally provided with the same reference symbols in all the figures.

Figure 1:
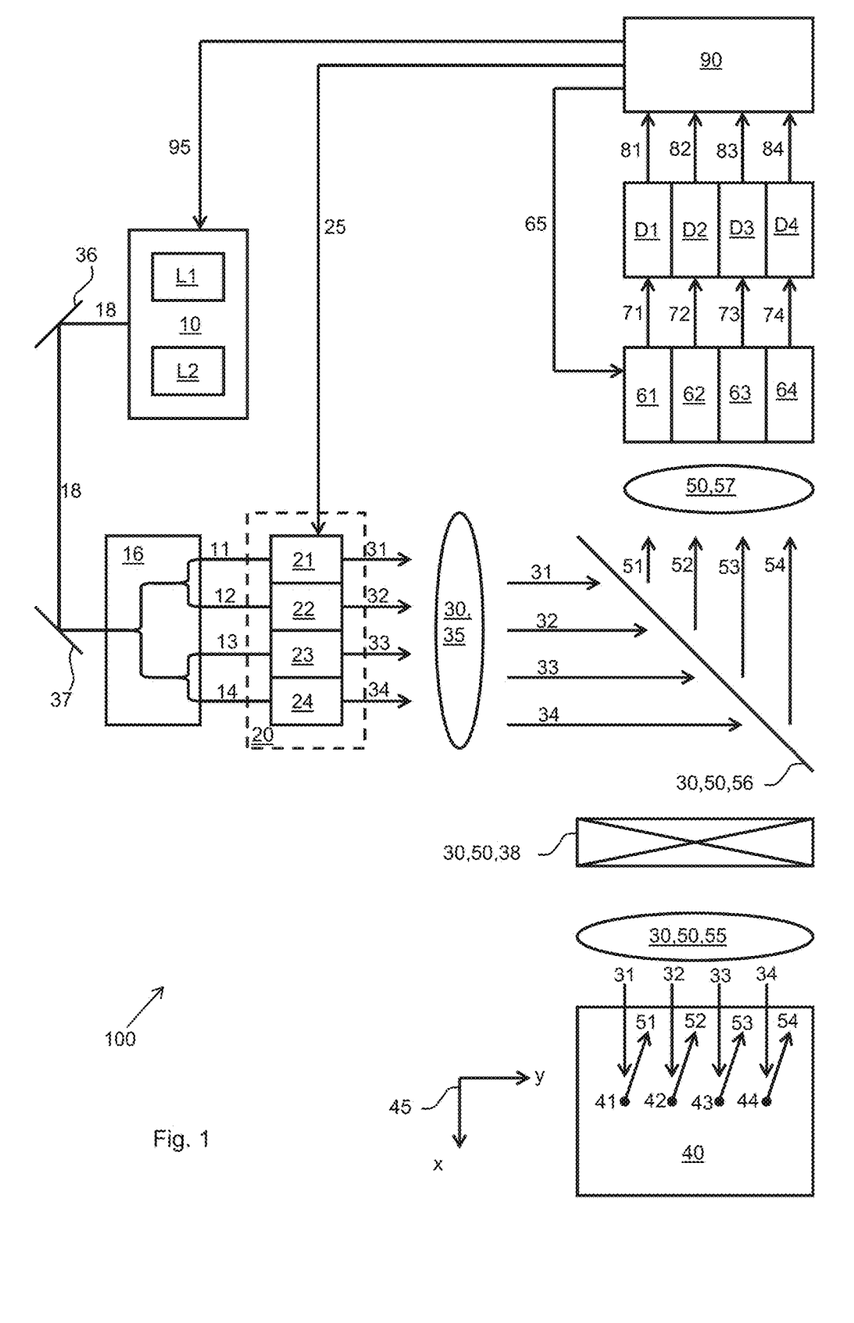
FIG. 1 shows a schematic illustration of a device according to the invention.

The exemplary embodiment schematically shown in FIG. 1 of a device 100 according to the invention has the following main components: a multicolour light source 10 for providing at least one illumination light beam 18, a splitting device 16 for splitting the illumination light beam into a plurality of illumination sub-beams 11, 12, 13, 14, first optical means 30, 35, 56, 38, 55 for providing an illumination optical path to guide and focus the individual illumination sub-beams 11, 12, 13, 14, 31, 32, 33, 34 respectively into a light spot 41, 42, 43, 44 on or in a specimen 40 to be examined.

A scan unit 38 (as part of the first optical means 30) is furthermore present for guiding the light spots 41, 42, 43, 44 over the specimen 40 and a detection unit which has detectors D1 to D4 for detecting detection light that is radiated by the specimen 40 in detection sub-beams 51, 52, 53, 54 after irradiation with the individual illumination sub-beams 31, 32, 33, 34.

Furthermore the device 100 has second optical means 50 for providing a detection optical path to guide the detection sub-beams 51, 52, 53, 54 to the detector unit and, finally, a control and evaluation unit 90 to control the scan unit 38 and to evaluate the detection light detected by the detection unit. The first optical means 30 and the second optical means 50 can in part have the same optical components, in particular a microscope objective. The scan unit 38 can for example be a conventional x-y scanner with galvanometric mirrors. The light source 10 can be controlled by the control and evaluation unit 90 via a connection 95.

According to the invention controllable beam manipulation means 21, 22, 23, 24 are also present in the illumination optical path, with which a spectral composition of the respective illumination sub-beam 11, 12, 13, 14 can be set independently in each case. The controllable beam manipulation means 21, 22, 23, 24 are brought together schematically in the exemplary embodiment shown in FIG. 1 to form a controllable beam manipulation device 20 which contains precisely these beam manipulation means 21, 22, 23, 24. Furthermore controllable spectral selection means 61, 62, 63, 64 are present according to the invention in the detection optical path, with which a spectral composition of detection light passing via the respective detection sub-beam 51, 52, 53, 54, 71, 72, 73, 74 to the detection unit can be independently influenced.

The multicolour light source 10 can be in particular a laser unit with a plurality of laser sources as in the illustrated example L1 and L2. The illumination light beam 18 emitted by the light source 10 passes in the example shown via mirrors 36, 67 to the splitting device 16, which can be in particular a waveguide chip. The coupling of the illumination light beam 18 into the splitting device 16 can be realised for example with the aid of an optical fibre which is optically and mechanically connected to the splitting device. The radiation leaving the fibre is thus coupled into the splitting device. However, a free beam coupling is also possible. The splitting device 16 is used to realise a splitting of the illumination light beam 18 across for example $2^n$ sub-beams. The letter "n" indicates the number of splitting cascades within the splitting device 16, for example thus within the waveguide chip.

In each cascade, by means of y splitters the light of a path can be split in approximately equal parts onto two new paths. It is for precisely this reason that a splitting across or onto $2^n$ sub-beams is to be preferred for efficiency reasons. In principle, however, any number of beams can be generated, for example by unnecessary sub-beams being faded out.

Beam splitters with this functionality are known from communications engineering. There, the optical conditions are, however, simpler in that only one wavelength, for example 1300 nm or 1550 nm, must be observed.

Within the scope of the preliminary works to the present invention it was recognised that in particular beam splitters based on layer waveguides can be advantageously used in microscopy and that also the high requirements, in particular with respect to the wide band aspect, can be fulfilled. It was recognised for example that it is possible to tune the respective intensities of the illumination light over all wavelengths better than 50%, even better than 25% or finally even better than 10% amongst each other. The better this spectral intensity tuning takes place over the individual illumination sub-beams, the more efficiently the laser source can be used for the described application. However, a beam splitter can also be used with an imperfect tuning for the device according to the invention and the method according to the invention and the image quality can also be improved with such beam splitters.

For example an averaging scan can be carried out. In this operating mode an area of interest in a specimen can be raster-scanned completely by each of the illumination sub-beams and subsequently an averaged image is calculated from all the individual images. A perfect tuning of the beams between themselves is not absolutely necessary for such averaging. This, initially passive, beam generation can, however, still be considerably improved and thus finally be used significantly more broadly.

This can be realised either on the splitting device 16, for example therefore the waveguide chip directly, by different light paths being influenced in their intensity. For this, integrated optical circuits, such as for example Mach-Zehnder interferometers, are known. Here, a phase shift between the light paths of a Mach-Zehnder interferometer is used to set the power at the output of this interferometer on the chip. A tuning of the optical outputs of the splitting device can thus be achieved quickly, for example within a few milliseconds.

In the exemplary embodiment shown schematically in FIG. 1 the beam manipulation unit 20, which can be referred to as the second stage, is downstream of the splitting device 16. In this second stage there is a controllable beam manipulation means 21, 22, 23, 24 for each illumination sub-beam 11, 12, 13, 14. These controllable beam manipulation means can also be described as spectrally selectively working elements and with these both the intensity and also the spectral composition can be set for each illumination sub-beam 11, 12, 13, 14.

In a particularly preferred variant, an AOTF (acousto-optic tunable filter) can be used as a controllable beam manipulation unit 20. Firstly an optical connection of the splitting device 16 to this AOTF can be realised. This takes place for example via a suitable free beam optical system. In principle, however, couplings via fibre bundles and directly coupled controllable beam manipulation means, for example directly coupled AOTFs, are also possible.

The controllable beam manipulation means 21, 22, 23, 24 are designed so that each of the illumination sub-beams 11, 12, 13, 14 can be influenced, or in other words modulated, individually and independently of the other illumination sub-beams 11, 12, 13, 14. An illumination sub-beam together with the associated controllable manipulation means 21, 22, 23, 24 is also called a single spatial channel. When using an AOTF up to eight colours for example can be processed in one spatial channel. For example an AOTF with different crystals, which consist for example substantially of $TeO_2$, can be used, or a single crystal with segmented transducer electrodes. Each illumination sub-beam can be individually influenced in its intensity. In addition the selection of the respective wavelengths of the light and the spectral intensity thereof in the respective illumination sub-beam can be set singly, individually and independently of the other illumination sub-beams. Due to these properties the arrangement and such controllable beam manipulation means are referred to as spatial wavelength selectors. These technical aspects will be explained in greater detail below by reference to FIG. 4.

Through the effect of the controllable beam manipulation means 21, 22, 23, 24, which are respectively arranged in the illumination sub-beams 11, 12, 13, 14, the illumination sub-beams 31, 32, 33, 34 are produced. The illumination sub-beam 31 comes about through the effect of the controllable beam manipulation means 21 on the illumination sub-beam 11. The same applies correspondingly to the further illumination sub-beams 32, 33, 34. The illumination sub-beams 31, 32, 33, 34 are then guided with first optical means 30, in the example illustrated specifically with optical components that are shown as a stylised lens 35, a main colour splitter 56, the scan device 38 and a microscope objective 55 onto a specimen 40. The illumination sub-beam 31 is thereby guided and focussed in a light spot 41, which can also be called a focal point, on or in the specimen 40 to be examined. The further illumination sub-beams 32, 33, 34 are correspondingly guided and focussed on the light spots 42, 43 or 44 respectively. The optical means 30 are in principle known components that are used in multispot scanning microscopy.

The scan unit 38 is particularly preferably arranged in a pupil of the optical path. In the situation shown schematically in FIG. 1, the light spots 41, 42, 43, 44 are offset in a y direction (with respect to the coordinate system 45 in FIG. 1). Scanning of the specimen 40 can be realised for example (if the spectra of the four illumination beams are all different) in such a way that the light spots 41, 42, 43, 44 move line by line from left to right (in FIG. 1 therefore from the top downwards, because the lines run in the x direction, see coordinate system 45) and at the end of one line all four light spots jump downwards by one line (thus to the left in FIG. 1). In principle, however, any variants are possible. For example, not all light spots 41, 42, 43, 44 need to be guided onto each specimen location. For example in the example just described, at the end of a line there can be a jump with all four light spots by four lines downwards. This variant is preferred if the spectra of the four illumination beams are all the same. In general, in the case of different spectra, all the scanning spots should scan each location in the specimen. However, the sequence can be as desired. Variants are also possible, wherein the light spots 41, 42, 43, 44 are guided one behind the other in a scanning direction. In principle any scan trajectories are possible, provided that the calculation of the final image takes these trajectories into account. A substantial advantage of multispot scanning microscopy can be seen in this multitude of possible variants.

When the individual light spots 41, 42, 43, 44 hit the specimen 40 to be examined, the specimen emits detection light in detection sub-beams 51, 52, 53, 54, wherein the detection sub-beam 51 comes from the light spot 41 and correspondingly the detection sub-beams 52, 53, 54 come from the light spots 42, 43 or 44 respectively. As the illumination sub-beams 31, 32, 33, 34 can in principle have a respectively different spectral composition, thus having different intensities for different wavelengths, the detection light in the individual detection sub-beams 51, 52, 53, 54 will therefore also differ—even if we assume that the specimen 40 to be examined is identical in type—in the regions illuminated by the light spots 41, 42, 43, 44.

The detection sub-beams 51, 52, 53, 54 are then guided in the device 100 according to the invention by means of second optical means 50, 55, 38, 56, 57 onto controllable spectral selection means 61, 62, 63, 64. Specifically, the detection sub-beams 51, 52, 53, 54 are guided back via the microscope objective 55 and the scan unit 38 to the main colour splitter 56. The main colour splitter 56 is usefully designed so that it transmits red-shift fluorescence portions in the detection sub-beams 51, 52, 53, 54. Via further optical components, which are shown schematically as a stylised lens 57, the detection sub-beams 51, 52, 53, 54 then reach the controllable spectral selection means 61, 62, 63, 64.

The detection sub-beam 41 thereby hits the controllable spectral selection means 61 and, accordingly, the detection sub-beams 52, 53, 54 hit the controllable spectral selection means 62, 63 or 64 respectively. The controllable spectral selection means are generally devices that manipulate the incoming or incident electromagnetic radiation, in particular light, in some way. Different physical effects such as absorption, scattering, refraction and diffraction can thereby become effective. In particular the dispersive effect can also become effective via the wavelength dependency of the refraction, for example in an optical prism, and/or via the wavelength dependency of the reflection, for example in a mirror. Adjustable filters, in particular graduated filters, are particularly preferably used as controllable spectral selection means 61, 62, 63, 64.

The control of the spectral selection means 61, 62, 63, 64 is realised via schematically indicated connections, in particular electrical line connections 65 to the control and evaluation unit 90. In addition the control and evaluation unit 90 controls, via a connection 25, in particular an electrical line connection, the controllable beam manipulation means 21, 22, 23, 24 in the illumination optical path.

Through the effect of the controllable spectral selection means 61, 62, 63, 64 upon the detection sub-beams 51, 52, 53, 54, the further detection sub-beams 71, 72, 73, 74 arise from the aforementioned detection sub-beams. Specifically the detection sub-beam 71 arises from the detection sub-beam 51 through the effect of the controllable spectral selection means 61, for example through the effect of a graduated filter. The same applies correspondingly to the further detection sub-beams 52, 53, 54 and 72, 73, 74. The detection unit has individual detectors D1, D2, D3, D4 for detecting the detection light in the different detection sub-beams 71, 72, 73, 74.

Specifically, the detection light is detected in the detection sub-beam 71 by the detector D1. Correspondingly the detection light is detected in the detection sub-beams 72, 73, 74 with the individual detectors D2, D3 or D4. The individual detector D1 transmits the detected detection light as an output signal 81 to the control and evaluation unit 90. Accordingly, the individual detectors D2, D3 and D4 supply output signals 82, 83 and 84 to the control and evaluation unit 90. The control and evaluation unit 90 evaluates the detection light detected by the detection unit, specifically therefore by the individual detectors D1, D2, D3, D4. A computer is normally used as a control and evaluation unit 90.

In the device according to the invention and the method according to the invention, therefore, with an arrangement wherein already in principle each light spot can be individually set in its spectral composition, a corresponding spectrally selective detection is therefore carried out. Particular advantages are thereby possible if the spectral detection, in other words thus the controllable spectral selection means 61, 62, 63, 64, as described, are constructed from filters, for example graduated filters. Spectral filters of this type are described for example in DE 10 2006 034 908 A1. Filter-based arrangements provide a cost-favourable and effective possibility of spectral detection.

In addition filter-based arrangements allow the scanning measurement of the point spread function (PSF) with a high optical quality. This can be used for methods, such as for example by the virtual pinhole (see in this connection: Handbook of Biological Confocal Microscopy, J. B. Pawley, $3^{rd}$ revised edition 2010) or the spatially resolved measurement of the point spread function, in order to increase the detection efficiency and the optical resolution. In principle there are also dispersive arrangements, thus working on the basis of the wavelength-dependent diffraction or refraction, that provide similar. These can also be designed so that a conservation of the detection PSF is ensured. An advantageous use in combination with the spatially spectrally selecting illumination can be realised similarly to the filter-based exemplary embodiment.

On the other hand the efficiency of such filters is always limited due to their complex structure. In other words, it is inefficient if a plurality of these filters were placed one behind the other. A meaningful and light-efficient splitting onto three different wavelength bands with two graduated filters arranged one behind the other is, however, still meaningful and highly feasible. Further filters on the same optical beam, thus on the same detection sub-beam, would make the associated outputs of the detection unit increasingly inefficient. This is in contrast with an increasingly broad range of fluorescence dyes which are to be measured with today's laser microscopes. The measurements are to be realised quickly and spatially with high precision. It is desirable in particular for the measurements to be realised simultaneously in only one single scan. In many cases, more than three spectral channels are to be measurable.

The advantage lies in the fact that there is no crosstalk of signals of different structures marked with dyes. However, movements of the specimen to be examined can lead to artifacts, for example in the measurement of co-localisations.

When measuring a plurality of wavelengths, there are thus two fundamental problems to be overcome: firstly, an efficient spectral detection for all wavelengths is to be achieved and, secondly, a spectral crosstalk through cross-excitation in the specimen or a spectral misallocation is to be avoided where possible in the detection.

In this connection the device according to the invention and the method according to the invention create substantial improvements. The controllable beam manipulation means 21, 22, 23, 24 present according to the invention, with which for each illumination sub-beam a spectral composition, to be understood for the present invention also as the respective intensities, can be set individually and independently of the other illumination sub-beams, can be combined with the spectrally selective detection to form a very efficient and spectrally sensitive microscope.

This is realised by the detection and the excitation being optimally set, via the wavelength selector, for the respective measurement task of the microscope. Different imaging modes can be differentiated, which solve the abovementioned problems in the best configuration.

For the present description, the entirety of the components: light source 10, splitting device 16 and controllable beam manipulation device 20 with the control via the connection 25 by the control and evaluation unit 90, are also referred to as a spatial wavelength selector or, simply, a selector.

An application of the device according to the invention and the method according to the invention is to be described below, wherein the recording speed is maximised and/or the photo damage to be accepted for the specimen to be examined is minimised. For this, the selector provides N beams, wherein N, which can be constituted from $2^n$ with a whole number n, is particularly advantageous but not necessary. The controllable spectral selection means, which can be in particular filters, and which can therefore also be described as detection filters, are set in this excitation setting so that they each have the same spectral signature. This will be explained in more detail below in connection with FIG. 2, wherein, for reasons of simplicity, not all beams are shown in the arrangement.

Figure 2:
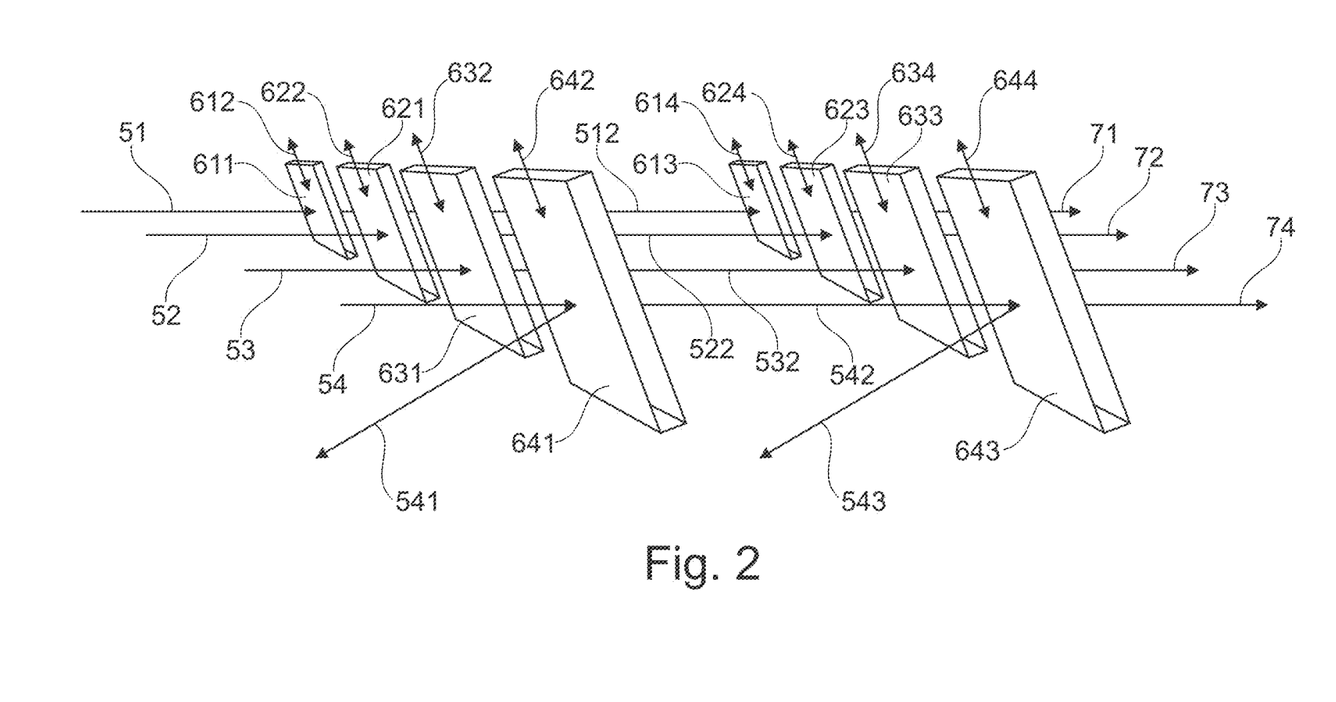
FIG. 2 shows an exemplary embodiment of spectral selection means, as used in the device according to the invention and the method according to the invention.

FIG. 2 shows a cut-out from the detection optical path in FIG. 1, wherein a specific exemplary embodiment of the controllable spectral selection means is shown. In FIG. 2, the detection sub-beams 51, 52, 53, 54 enter from the left and the detection sub-beams 71, 72, 73, 74 influenced by the controllable spectral selection means exit to the right in the direction of the detection unit. The controllable spectral selection means are formed for all four detection sub-beams 51, 52, 53, 54 respectively by a pair of graduated filters. In the case of the detection sub-beam 51 this is the pair of graduated filters 611 and 613. Accordingly, the pairs of graduated filters with the reference symbols 621 and 623, 631 and 633 and respectively 641 and 643 belong to the detection sub-beams 52, 53, 54. The graduated filters can each be mechanically adjusted relative to the detection sub-beams 51, 52, 53 and 54 in a direction substantially transverse to these detection sub-beams. This mechanical degree of freedom is shown in FIG. 2 by the double arrows 612, 614, 622, 624, 632, 634, 642, 644.

The graduated filters 611, 621, 631, 641 work in such a way that light with a wavelength that is lower than a threshold wavelength is reflected and light with a wavelength that is greater than the threshold wavelength is on the other hand transmitted. The threshold wavelength can be set by mechanically adjusting the graduated filters respectively in the directions indicated by the double arrows. For the situation shown in FIG. 2, this is explained in more detail with reference to the detection sub-beam 54. The detection sub-beam 54 incoming from the left in FIG. 2 has a certain spectral composition which depends substantially upon the spectral composition of the associated and preceding illumination sub-beam 11, 31 in the illumination optical path and the properties of the specimen 40 to be examined. In particular the spectral composition of the detection sub-beam 54 contains specific information on the fluorescence dyes contained in the specimen volume that is hit by the associated light spot 44. The detection sub-beam 54 hits the graduated filter 641 which is set to a certain threshold wavelength. The light 541 reflected back by this graduated filter 641 contains only the radiation portions with wavelengths that are smaller than the set threshold wavelength. A portion 542 of the detection sub-beam 54 transmitted by the graduated filter 641 contains essentially only radiation portions with wavelengths that are greater than the threshold wavelength set for the graduated filter 641.

The further graduated filter 643, which is then hit by the radiation portion 542 that has passed through the graduated filter 641, has inverse properties. Incident radiation with wavelengths that are greater than the threshold wavelength set for the graduated filter 643 are reflected, whereas radiation portions with wavelengths that are smaller than the threshold wavelengths set for the graduated filter 643 are allowed to pass. The detection sub-beam 74 exiting towards the right therefore contains only radiation portions, of which the wavelengths are greater than the threshold wavelength of the graduated filter 641 and smaller than the threshold wavelength of the graduated filter 643. The radiation portion 543 radiated back by the graduated filter 643 contains only wavelengths that are both greater than the first threshold wavelength of the graduated filter 641 and also greater than the threshold wavelength of the graduated filter 643.

By combining the graduated filters 641 and 643 this results in a bandpass filter that only allows radiation portions to pass, of which the wavelengths are between the threshold wavelength of the graduated filter 641 and the threshold wavelength of the graduated filter 643. In order that radiation can be transmitted at all, it is absolutely necessary for the threshold wavelength of the graduated filter 643 to be greater than that of the graduated filter 641. There are thus three detectable wavelength bands in the outputs 541, 543 and 74, wherein in 541 the portions with wavelengths shorter than the threshold frequency of the graduated filter 641, in 543 the portions with wavelengths greater than the threshold wavelengths of 641 and 643, and in 74 the portions with wavelengths between the two threshold wavelengths, can be detected. The light thus passes through a long-pass and then a short-pass. However, the sequence of the passage can also contain a short pass-long pass combination.

The graduated filters 611 and 613 in the detection sub-beam 51, 71, the graduated filters 621, 623 in the detection sub-beam 52, 72 and the graduated filters 631, 633 in the detection sub-beam 53, 73 work in the same way as the graduated filters 641 and 643 in the detection sub-beam 54, 74. The radiation portions respectively reflected back by the graduated filters are not individually shown, however, for the detection sub-beams 51, 71 . . . 53, 73, this being for reasons of simplicity. In principle the graduated filters 611, 621, 631 and 641 on the one hand and the graduated filters 613, 623, 633 and 643 on the other hand can be respectively different graduated filters. However, respectively identical graduated filters are particularly preferably used.

In the situation shown in FIG. 2, the threshold wavelengths for the first graduated filters 611, 621, 631, 641 in the detection optical path on the one hand and the threshold wavelengths of the subsequent graduated filters 613, 623, 633, 643 in the detection optical path on the other hand are respectively the same. This means that identical bandpass filters are provided by the pairs of graduated filters 611 and 613, 621 and 623, 631 and 633 and also 641 and 643. This configuration can be used in order to scan a specimen in a parallel mode. Each light spot, which can also be described as a scanning spot, measures only a part of the specimen. For example, four light spots lying vertically one below the other can be guided from left to right over a specimen to be examined and, after scanning of a first region, the scanner can be set so that the four light spots jump in a fairly large leap to the next region to be scanned. This is called a towel-scan (Handtuch-Scan).

It is clear that with a given pixel dwell time the time, in which a certain specimen region is scanned, is reduced by a factor corresponding to the number of light spots or scanning spots. In the example shown this time is thus reduced by a factor of four. The configuration shown in FIG. 2 can also be used in a further mode, in order to achieve an improved signal-to-noise ratio. For this, each light spot thereby goes over, by way of deviation from the variant just described, the whole image field to be used in the specimen. Each point on the specimen is thus scanned four times if four illumination sub-beams are used. In comparison with a scanning microscopy, wherein only one single light spot is raster-scanned or scanned over the specimen, provided that there are no saturation or bleaching effects, an increase in the signal is achieved by a factor, which in turn corresponds to the number of light spots used, in the mentioned example thus by a factor of four. This is followed by an averaging of the images obtained in this way and the representation of an averaged image with a signal-to-noise ratio improved by the factor $\sqrt{N}$. A precondition for this is that the light emission of the dye must not yet be in saturation. This imaging mode is of interest in particular, but not exclusively, if the specimen is raster-scanned with a very rapidly scanning system, for example with a resonance scanner.

An important variable in resonantly scanning systems is the pixel dwell time, thus the time during which a light spot dwells or remains on a certain specimen region or specimen volume. This is generally for standard settings, for example with 512 times 512 pixels and a resonance scanner which is operated at 8 kHz or higher resonance frequencies, clearly below 100 ns.

The averaging mode can now lead, in the case of rapid imaging of a resonant system, which is also possible on a large image field, to a pixel dwell time that is effectively longer by the factor N and thus also a signal-to-noise ratio that is higher by the factor $\sqrt{N}$ being achieved. However, the precise gain factor of the SNR can deviate from $\sqrt{N}$, as it also depends upon the dye and the laser power used. Particularly in the case of dyes in saturation, by increasing the laser power the signal can only be slightly increased, but the specimen is increasingly damaged. In addition the image dynamics with very short pixel times are limited by the specimen only still being able to emit a small number of photons in this time. As the averaging mode increases the effective pixel time the dynamics in the image thus simultaneously increase. Such a mode thus additionally has great advantages in combination with rapidly scanning and in particular resonantly scanning systems.

Figure 3:
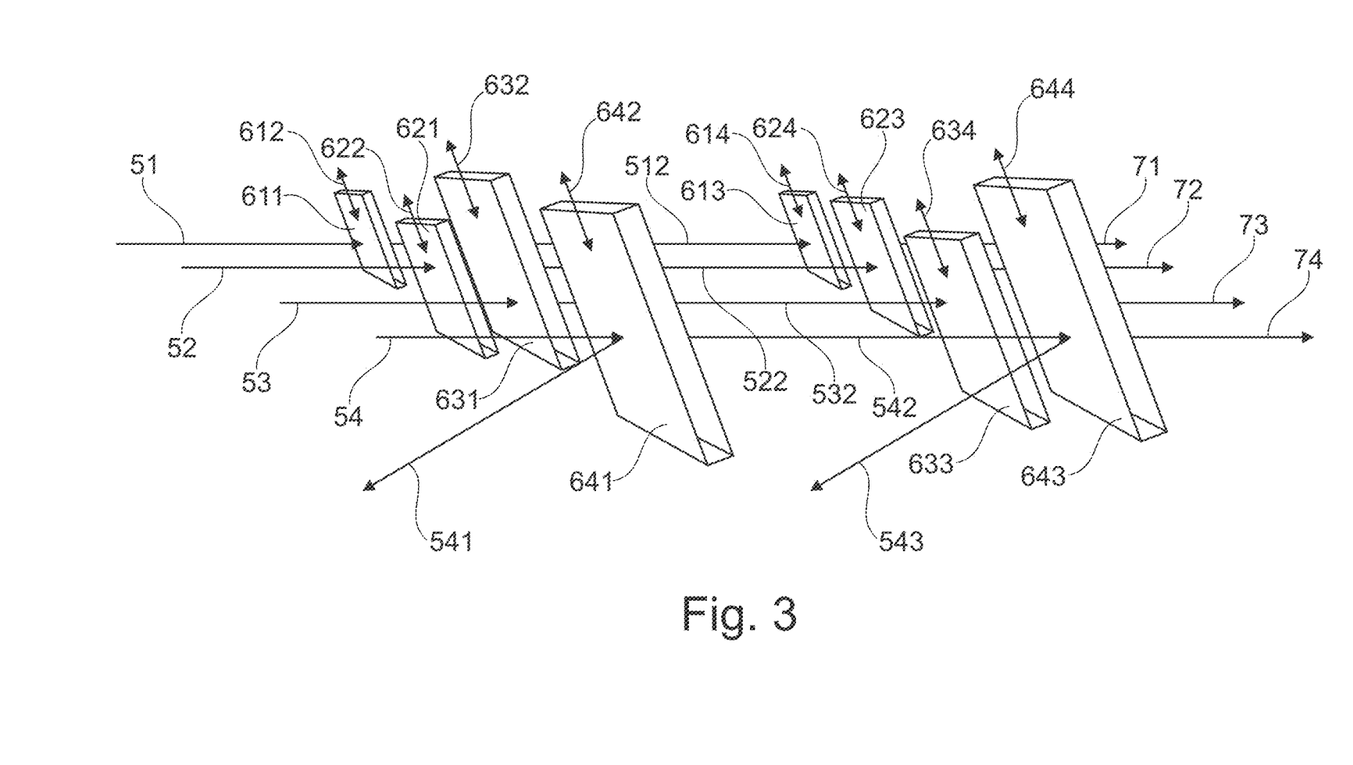
FIG. 3 shows the spectral selection means of FIG. 2 in a different operating state.

A further example application of the arrangement of graduated filters explained in connection with FIG. 2 will be described by reference to FIG. 3. The arrangement shown there of graduated filters is in principle the same as in FIG. 2. The differences lie in the respective setting of the threshold wavelengths for the individual graduated filters. By way of deviation from the configuration shown in FIG. 2, wherein the threshold wavelengths for the first graduated filters 611, 621, 631 and 641 in the optical path on the one hand and for the subsequent graduated filters 613, 623, 633 and 643 in the optical path on the other hand are the same, with the result that identical bandpass filters are provided for all four detection sub-beams 51, 52, 53, 54, the settings of the threshold wavelengths in the configuration shown in FIG. 3 are different for all graduated filters. In general the threshold wavelengths are, however, usefully set in any case so that a bandpass filter with a final width is provided. This means that the threshold wavelength of the graduated filter 613 is greater than that of the graduated filter 611. The same applies correspondingly to the pairs of graduated filters 621 and 623, 631 and 633, as well as 641 and 643. In general the wavelength intervals covered by the respectively provided bandpass filters are, however, different.

Specifically the setting of the graduated filters 611 and 613 for the detection sub-beam 41 is realised in dependence upon the spectral composition of the associated illumination sub-beam 31 that precedes in the optical path, in other words therefore in dependence upon the spectral composition of the illumination light which hits the light spot 41 from which the corresponding detection sub-beam 51 comes. The same applies correspondingly to the other detection sub-beams 52, 53 and 54. This means, if we remain with the example of the first detection sub-beam 51, that the control of the controllable beam manipulation means 21, particularly preferably thus of a channel of a multichannel AOTF, on the one hand and the control of the controllable spectral selection means, for example thus the graduated filters 611 and 613, on the other hand are realised with tuning to each other.

The control and evaluation unit can thereby be advantageously designed for mutually tuned control of the beam manipulation means in a certain illumination sub-beam on the one hand and the spectral selection means in that detection sub-beam that comes from the light spot generated by the certain illumination sub-beam on the specimen on the other hand. It is particularly preferable for example for the beam manipulation means 21 and the spectral selection means 611, 613 to be controlled in such a way that a certain fluorescence dye is purposefully excited on or in the specimen and its fluorescence emission detected.

The combination of the illumination, thus the excitation, and the detection in a measurement method can thus be realised in the invention advantageously so that a defined spectral signature is set for each of the N illumination sub-beams with the aid of the controllable beam manipulation means. In dependence thereon and corresponding thereto, the controllable spectral selection means, in particular therefore a filter unit formed by the entirety of the graduated filters of FIGS. 2 and 3, can be set so that a detection that is optimal for the spectral excitation signature can be realised in each illumination and detection channel.

An image formation in such a mode, which can also be called a spectral mode, can be realised in that the different spectral image portions are recorded at partially different locations in the specimen and merged, i.e. brought together, to form a spectral image. This image can then be displayed on a computer screen, for example in a false colour representation. A false colour representation in this connection is understood to be a representation in which the light emitted by certain fluorescence dyes is shown in respectively different colours, but of which the wavelength does not have to correspond to the radiation actually emitted by the respectively observed dyes. To merge the respective sub-images, which arise from the individual detection sub-beams, it may be necessary to carry out suitable coordinate displacements, because the light spots 41, 42, 43, 44 in one and the same scanner setting lie on different specimen locations.

In the parallel mode, with N illumination sub-beams, each of the detection sub-beams provides a sub-image which (if scanned line by line and with a further jump by N lines in the scanning) contains image data respectively only for each Nth line. These individual sub-images can be put together to form an overall image. The intensity contrast in the overall image corresponds to the intensities measured at the individual points of the specimen. In the same way as in the spectral mode, it will be necessary, for merging the respective sub-images which arise from the individual detection sub-beams, to carry out suitable coordinate displacements because the light spots 41, 42, 43, 44 lie on different specimen locations in one and the same scanner setting.

At its simplest, the production of an overall image for the averaging mode is provided, wherein the intensities measured for the individual detection sub-beams for the different points of the specimen are respectively added. Clearly, it must also be ensured here that the correct intensities, thus those really belonging to one and the same specimen point, are added. This means that, in the averaging mode, too, suitable coordinate displacements must be carried out, because with one and the same scanner setting the light spots 41, 42, 43, 44 lie on different specimen locations. As in the parallel mode, the intensity contrast in the overall image in the averaging mode corresponds to the intensities respectively measured at the individual points of the specimen.

In principle, a plurality of colours can simultaneously be present for excitation in each of the illumination sub-beams. For example, in the case of a three channel detection with a spatial dual splitting, six spectral channels can thus be measured and used. If a different colour signature is formed for each light spot or scanning spot, 12 spectral channels can be spread with fourfold spatial excitation and three channel detection. In general it is possible to split, with an N-fold spatially spectral excitation with M detection channels N times M components. In general in the device according to the invention and the method according to the invention the N excitation channels can be split as desired into spatial and spectral channels.

Through the invention an optical arrangement is thus indicated, with which a microscopic image recording which is optimised with respect to the measurement task and the specimen to be measured is possible. In addition the device according to the invention can be controlled so that it optimises itself corresponding to a user instruction. This means that the measurement task defined by the user is translated into optimal settings of the optical arrangements, in other words thus to an optimal setting of the controllable beam manipulation means on the one hand and the controllable spectral selection means on the other hand. Using algorithms an optimised strategy for measuring a certain specimen can then be found and set in the hardware components.

Figure 4:
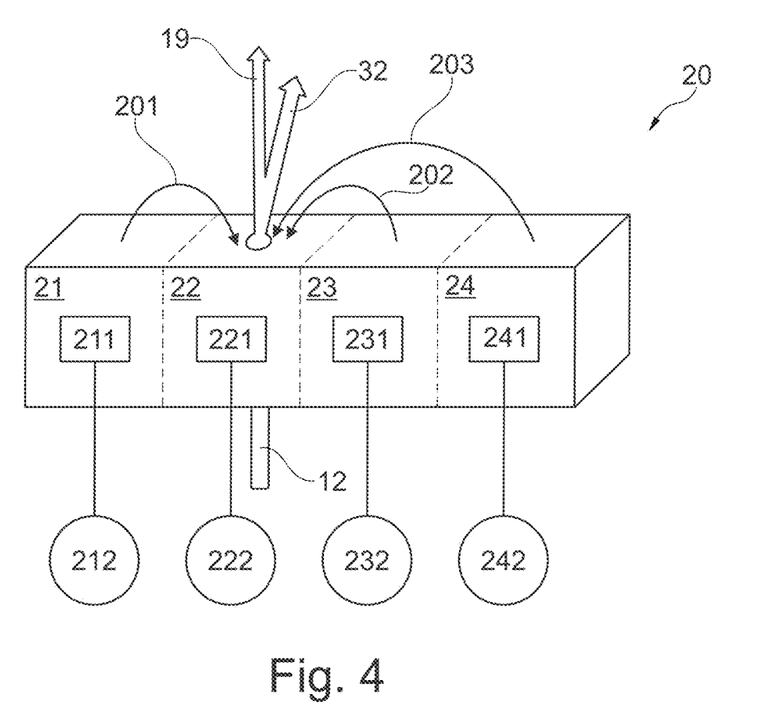
FIG. 4 shows a schematic illustration of a multichannel AOTF which can be used as a controllable beam manipulation means in the illumination optical path of the device according to the invention.

In association with FIG. 4, a multichannel AOTF is described, such as can be used as a controllable beam manipulation device 20 in a device according to the invention. FIG. 4 shows schematically such a multichannel AOTF 20 which consists in principle of a homogenous crystal, for example of $TeO_2$. It is indicated through broken lines that this crystal is split in total into four spatial regions, i.e. four spatial channels, through which respectively one controllable beam manipulation means 21, 22, 23, 34, the latter functionally constituting in principle individual AOTFs, is formed. To control these individual channels, thus the individual AOTFs 21 22, 23, 24, transducers 211, 221, 231 and 241 are respectively arranged at these AOTFs in the manner shown schematically in FIG. 4. The transducers are piezoelectric crystals which are bonded to the respective AOTF 21, 22, 23, 24 and with which the soundwave necessary to achieve the desired optical properties is introduced into the crystal. The signals, with which the individual transducers 211, 221, 231 and 241 are controlled, are schematically illustrated in FIG. 4 by the circles 212, 222, 232 and 242. The principle can fundamentally be transferred to any number n of channels.

Two-dimensional arrangements of transducers, which are also described as arrays, are in principle also possible and the principle explained here can also be transferred to them. For reasons of simplicity the interaction of the transducers between themselves is shown in a simplified manner. In the example shown in FIG. 4 the AOTF 22 is considered, which is hit by an illumination sub-beam 12 coming from below. Through the effect of the soundwave generated in the AOTF 22 by the transducer 221, a part of the light in the illumination sub-beam 12 is deflected into the illumination sub-beam 32, more specifically: it is diffracted. In addition there is a radiation portion 19 which passes without diffraction through the AOTF 22. An important factor for the following consideration is that not only the control signal 222 imposed via the transducer 221 is significant for the transmission properties of the AOTF 22, but also the control signals 212, 232 and 242, with which the transducers 211, 231 and 241 of the AOTFs 21, 23, and 24, respectively, are controlled. The control of the further AOTFs 21, 23, 24 thus also influences the diffraction grating which is generated in the AOTF 22. These interactions are shown schematically in FIG. 4 by the arrows 201, 202 and 203.

It is assumed for the following consideration that all transducers 211, 221, 231 and 241 are controlled with a sinusoidal signal of equal frequency, wherein $f(\lambda)$ is the excitation frequency of the respective AOTF 21, 22, 23, 24 required for the wavelength $\Delta$ of the laser light. The signal generators are synchronised between themselves according to the invention and the starting phase $\theta(n)$ can be separately set for each of the signal generators 212, 222, 232 and 242. The sinusoidal carrier frequencies are additionally influenced in their amplitude by a modulation function $m_n(t)$. Depending upon the application the modulation functions $m_n(t)$ for the transducers 211, 221, 231, 241 can be different or identical. The time signals at the transducer can then be described as follows:

$$S_n(t) = m_n(t) \times \sin(2\pi f_\lambda t + \theta_n)$$

If a plurality of bundles of respectively M laser lines with different wavelengths $\lambda_n$ are to be influenced by the acousto-optic element 20, the resulting control signal of the nth channel arises through the superposition/summation of M signals $S_n(t)$. Crosstalk between the transducers results in the intensity of the diffracted laser light, for example in the channel belonging to the AOTF 22, not only being influenced by the control signal 222 but also being influenced by the control signals at the other transducers 211, 231, 241 of the multichannel acousto-optic element 20.

The degree of influence is dependent, inter alia, upon the electrical insulation between the different channels, the distance of the optical channels from each other and the specific geometry of the transducers. Depending upon the design, values of approximately 30 dB are reached for the optical insulation between the channels, wherein the main portion of the crosstalk is caused by defective electrical insulation between the channels. This can be problematic especially if the transducers 211, 221, 231, 241 are spatially close to each other. Precisely this, however, is an important application, as is present for example with use in a multichannel laser scanning microscope. The beams to be manipulated or influenced are to be at as short a distance as possible from each other in order to maintain the requirements upon the optical system within an acceptable scope. Therefore, closely adjacent transducers are desired. However, these necessarily cannot be insulated as desired.

If a difference of the starting phase of the control signals (212, 222, 232, 242) of two adjacent channels is selected so that it is $90°+k\times180°$, wherein k is a whole number, the control signals of these channels are orthogonal relative to each other. For the mutual influencing of the channels, a minimum can be achieved in this way. The invention thus recognised that it is particularly advantageous if the control of the transducers in the case of a multichannel acousto-optic element, such as for example a multichannel AOTF or a multichannel AOM, is realised phase-rigidly. This means at the same time that the control signals at the transducers of all channels for each wavelength $\lambda$ to be transmitted must have exactly the same excitation frequency $f_\lambda$. If this is not the case, due to the interactions between the channels of the multichannel acousto-optic element, intensity fluctuations of the laser light arise, wherein the frequencies of the intensity fluctuations correspond to the differential frequencies of the control signals.

The invention thus relates to a novel device and a novel method for multispot scanning microscopy. The solution according to the invention requires a parallel illumination. This illumination must be switchable in the above-described sense in each illumination channel, but at least in a sub-quantity of channels, i.e. switchable in particular with respect to intensity and wavelength of the radiation in this channel. A waveguide chip, as described above, can thereby be advantageous. Other possibilities of beam splitting are also possible.

The detection can also be realised in the simplest configuration of the teaching according to the invention without spectral separation/splitting. With N spatially spectral channels a measurement of precisely N spectral channels over the spatial division in the spectral excitation signature is possible. On the other hand the N spatial channels can also be used in parallel for a more rapid image recording or in order to utilise an improved signal-to-noise ratio in the image at a given framerate. A framerate is to be understood here to be the number of microscopic images recorded per time unit.

With the device according to the invention and the method according to the invention a flexibly adjustable optical arrangement for optimal image recording of a specimen is provided, wherein an optimisation with respect to spatial and spectral measurement channels is possible. An optimum can also be set and achieved with respect to the specimen damage and the recording time. In the method according to the invention, a microscopic measurement of a specimen with self-optimisation with respect to spatial and spectral measurement channels and also with respect to temporal resolution and reduction of the specimen damage is also possible.

In particularly advantageous embodiments a spatial light distribution is generated polychromatically with an optical waveguide. The spatial light distribution can be individually modulated with segmented elements, for example with a multichannel AOTF. The spectral signature of the spatial light distribution can be set individually for each light beam. For example, with the same spectral signature of all sub-beams, a defined but respectively different brightness can also be set. A recording with increased dynamics in the image is therefore possible. The device according to the invention and the method according to the invention can also be used for temporal influencing of the beams between themselves. In particular, in the above-described averaging method the brightness of the sub-beams can be regulated in dependence upon the signals of the other respective sub-beams. An increase in image dynamics and possibly a reduction in photo damage are in turn hereby possible.

In addition the detection can also be flexibly set, in particular corresponding to the excitation and together with this in relation to a measurement task to be solved. Finally, the components in the optical beam paths can be selected so that the point spread function is maintained. For this, filter arrays are particularly preferably used in the detection optical path, with which the spatial scanning of the point spread function is used to increase the signal-to-noise ratio and to increase the resolution. These methods are also known under the keywords "photon reassignment" or Airy-scan methods.

What is claimed is:

1. Device for multispot scanning microscopy,
    having a multicolour light source for providing at least one illumination light beam,
    having a splitting device for splitting the illumination light beam into a plurality of illumination sub-beams,
    having first optical means for providing an illumination optical path for guiding and focussing the individual illumination sub-beams into a respective light spot on or in a specimen to be examined,
    having a scan unit for guiding the light spots over the specimen,
    having a detection unit for detecting detection light radiated by the specimen in detection sub-beams while or after the specimen is irradiated with the individual illumination sub-beams,
    having second optical means for providing a detection optical path for guiding the detection sub-beams to the detector unit,
    having a control and evaluation unit for controlling the scan unit and for evaluating the detection light detected by the detection unit, wherein
    in the illumination optical path for at least two of the illumination sub-beams a controllable beam manipulation means is present for independently setting a spectral composition of the respective illumination sub-beam and the control and evaluation unit is designed to control the beam manipulation means.

2. Device according to claim 1,
wherein
in the detection optical path for at least two of the detection sub-beams a controllable spectral selection means is present for independent influencing of a spectral composition of detection light passing via the respective detection sub-beam to the detection unit and
the control and evaluation unit is also designed to control the spectral selection means.

3. Device according to claim 1,
wherein
in the illumination optical path for each illumination sub-beam a beam manipulation means is present for independent setting of a spectral composition of the illumination sub-beam.

4. Device according to claim 1,
wherein
in the detection optical path for each detection sub-beam a controllable spectral selection means is present to independently influence a spectral composition of detection light passing via the respective detection sub-beam to the detection unit.

5. Device according to claim 1,
wherein
the detection unit has a plurality of individual detectors for measuring the detection light which is emitted by a certain light spot on the specimen.

6. Device according to claim 1,
wherein
the optical components in the detection optical path are components conserving the point spread function.

7. Device according to claim 1,
wherein
the controllable spectral selection means are components conserving the point spread function.

8. Device according to claim 5,
wherein
the individual detectors are respectively spatially resolving detectors.

9. Device according to claim 5,
wherein
the individual detectors are selected from the group constituted by two-dimensional photodiode arrays, single photon avalanche photo diode arrays (SPAD arrays), microchannel plates and fibre-coupled photomultipliers.

10. Device according to claim 1,
wherein
the beam manipulation means have a plurality of acousto-optic elements.

11. Device according to claim 1,
wherein
the beam manipulation means have a plurality of acousto-optic elements selected from the group constituted by AOM, AOD and AOTF.

12. Device according to claim 1,
wherein
the beam manipulation means have at least one multichannel AOTF.

13. Device according to claim 12,
wherein
control signals for different channels of the spatially multichannel AOTF have a constant phasing relative to each other.

14. Device according to claim 12,
wherein
control signals for different channels of the spatially multichannel AOTF after a switch-on process have a constant phasing relative to each other.

15. Device according to claim 12,
wherein
the excitation signals of the multichannel AOTF for spatially adjacent channels have a relative phase distance of 90°+n times 180°, wherein n is a whole number.

16. Device according to claim 1,
wherein
the splitting device has at least one waveguide chip.

17. Device according to claim 2,
wherein
the control and evaluation unit is designed for mutually tuned control of the beam manipulation means in a certain illumination sub-beam on the one hand and of the spectral selection means in that detection sub-beam that comes from the light spot generated by the certain illumination sub-beam on the specimen on the other hand.

18. Device according to claim 17,
wherein
the control and evaluation unit is designed to control the beam manipulation means and the spectral selection means to detect at least one certain fluorescence dye on or in the specimen.

19. Device according to claim 17,
wherein
the control and evaluation unit is designed to control the beam manipulation means and the spectral selection means to detect precisely one certain fluorescence dye on or in the specimen.

20. Device according to claim 2,
wherein
the selection means have at least one of a colour filter, a dispersive means, a refractive means, a prism, a diffractive means, a diffraction grating, a spectrally selectively reflecting means, and a mirror.

21. Device according to claim 20,
wherein
the colour filters are graduated colour filters.

22. Device according to claim 2,
wherein
the controllable selection means for all detection sub-beams are the same.

23. Device according to claim 1,
wherein
the first optical means and the second optical means have as common components at least one of a microscope objective, an x-y scanner unit and a main colour splitter.

24. Method for multispot scanning microscopy
wherein at least one illumination light beam is provided with a multicolour light source,
wherein the illumination light beam is split into a plurality of illumination sub-beams,
wherein the individual illumination sub-beams are guided in an illumination optical path into a respective light spot on or in a specimen to be examined and scanned over this,
wherein detection light radiated by the specimen in detection sub-beams while or after the specimen is irradiated with the individual illumination sub-beams is guided onto a detector unit and detected by this, wherein a spectral composition of the illumination light for at least two of the illumination sub-beams is independently set.

25. Method according to claim 24,
using the device according to claim 1.

26. Method according to claim 24,
wherein
in the case of at least two detection sub-beams a spectral composition of detection light passing via the respective detection sub-beam onto the detection unit is independently set.

27. Method according to claim 24,
wherein
the spectral composition of the illumination light is independently set for each illumination sub-beam.

28. Method according to claim 25,
wherein
for each detection sub-beam the spectral composition of detection light passing via the respective detection sub-beam onto the detection unit is independently influenced.

29. Method according to claim 25,
wherein
the beam manipulation means are controlled so that the spectral composition for all illumination sub-beams is the same.

30. Method according to claim 25,
wherein
the beam manipulation means are controlled so that each illumination sub-beam has a different spectral composition.

31. Method according to claim 24,
wherein
the controllable selection means are set equally in all detection sub-beams.

32. Method according to claim 25,
wherein
the beam manipulation means in a certain illumination sub-beam on the one hand and the spectral selection means in the detection sub-beam coming from the light spot generated by the certain illumination sub-beam on the specimen on the other hand are controlled tuned to each other.

33. Method according to claim 32,
wherein
the spectral composition of the illumination light in the illumination sub-beam is set and the spectral selection means are controlled in the detection sub-beam to detect at least one certain fluorescence dye.

34. Method according to claim 32,
wherein
the spectral composition of the illumination light in the illumination sub-beam is set and the spectral selection means are controlled in the detection sub-beam to detect precisely one fluorescence dye.

35. Method according to claim 24,
wherein
for the independent setting of the spectral composition of the illumination light in the illumination sub-beams at least one multichannel AOTF is used as beam manipulation means.

36. Method according to claim 35,
wherein
the control signals for the different channels of the multichannel AOTF have a constant phasing relative to each other.

37. Method according to claim 35,
wherein
the control signals for the different channels of the multichannel AOTF after a switch-on process have a constant phasing relative to each other.

38. Method according to claim 24,
wherein
the excitation signals of the multichannel AOTF for spatially adjacent channels have a relative phase distance of 90°+n times 180°, wherein n is a whole number.

39. Method according to claim 24,
wherein
a resulting image is at least one of calculated, generated and shown from the respectively detected detection sub-beams to solve a measurement task.

\* \* \* \* \*